Nov. 18, 1969  K. BUDZYNSKI ET AL  3,479,019

OPEN-HEARTH FURNACE

Filed June 19, 1967

United States Patent Office 3,479,019
Patented Nov. 18, 1969

3,479,019
OPEN-HEARTH FURNACE
Kazimierz Budzynski, Ul. Francuska 49/5, and Leopold Juszczyk, Ul. Powstancow 35, both of Katowice, Poland; Zdzislaw Bonenberg, Ul. Brodzinskiego 5, Zabrze, Poland; Daniel Dybal, Wybrzeze Wojska Polskiego 4, Gliwice, Poland, and Stanislaw Zakrawacz, Ul. R. Sliwy 11, Zabrze, Poland
Filed June 19, 1967, Ser. No. 691,076
Claims priority, application Poland, June 18, 1966, P 115,197
Int. Cl. F27d 1/00; F23m 5/06, 7/00
U.S. Cl. 263—46   1 Claim

ABSTRACT OF THE DISCLOSURE

An open-hearth furnace equipped with a shiftable one-piece, non-sectional furnace roof over the working space of the furnace, enabling charging the furnace from top. The non-sectional, single-piece furnace roof may be shifted to one side, whereby the hearth is uncovered completely, or placed in two opposite end positions, whereby in each end position of the roof more than a half of the hearth of the furnace is uncovered.

---

The invention relates to an open-hearth furnace equipped with a shiftable furnace roof in order to render possible charging great portions of solid charge, fed from the top of the furnace.

There are known open-hearth furnaces with shiftable sectional roof. Through pushing aside two halves of the sectional roof an open space is formed above the hearth of the furnace, which enables feeding a container with an important portion of a solid charge.

Although such design of the roof performs its essential purpose of enabling feeding the charge in great portions from the top of the furnace, shows, however, an important disadvantage. Namely, the line of contact between two halves of the roof being pushed aside needs to be sealed. The sealing is realized by means of segments of the tube or box type, cooled with water, and which are very inconvenient in exploitation. These segments, exposed to detrimental influences of high temperatures and mechanical shocks, especially when closing, are frequently damaged.

Moreover, said mechanical shock affected by closing the roof, which is very difficult to absorb, very importantly influences the decrease of the durability of the setting of the roof.

The mentioned disadvantages of known designs are removed in the structure of the open-hearth furnace according to the invention. Namely, according to the invention a single-piece roof of the furnace is applied over the working space, which is entirely shifted towards one or both sides. In the case of shifting the roof towards two opposite sides, the roof shifted in one of its end positions uncovers more than a half of the furnace hearth, rendering possible feeding the charge from the top to the uncovered part of the hearth, whereafter the roof is shifted to its other end position, permitting feeding the charge to the remaining part of the hearth.

In the case of application of a roof shifted only towards one side, it uncovers the entire hearth of the furnace, which permits feeding the complete charge by a single portion.

Application of the roof shifted only to one side depends evidently on a suitably dimensioned free area of the furnace bay. But application of the open-hearth furnace with a single piece roof according to the invention eliminates the necessity of applying complicated sealing elements and importantly increases the durability of the setting of the roof.

Figure 1:
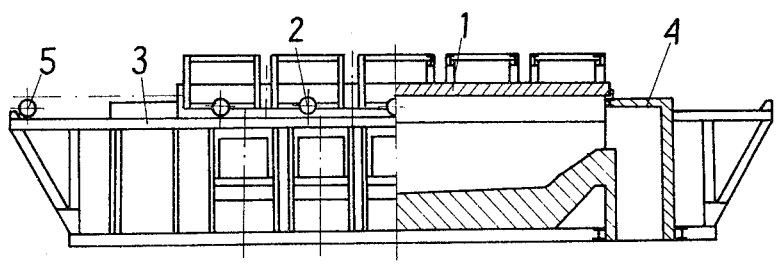
Figure 2:
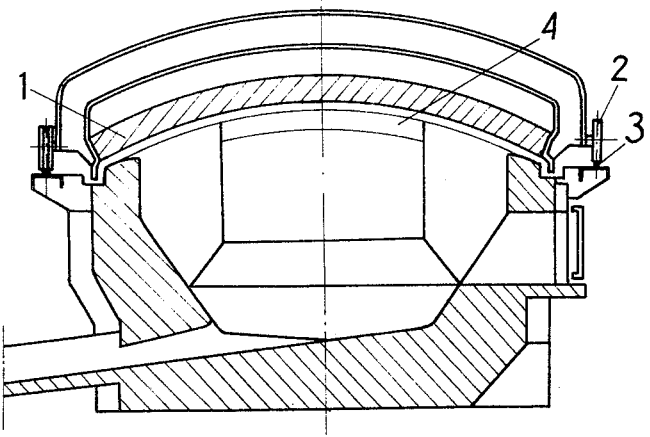

The open-hearth furnace according to the invention is shown in accompanying drawing, where:

FIG. 1 shows the view of the front wall and the longitudinal section, along the longitudinal axis of the furnace, and FIG. 2 shows the cross section along the cross axis of the furnace.

The not sectional, single-piece roof 1 of the furnace is born upon a movable, most preferably multi-wheel or multi-roller chassis 2, which enables an easy shifting of the roof 1 of the furnace towards one or both ends of the longitudinal axis of the furnace, over the guideway 3. The roof 1 is then shifted over the non-shiftable roofs 4 of the open-hearth furnace blocks. For shifting the roof 1 along the guideway 3 a known driving device 5 is used, most preferably in form of a rope winch.

The operation of the roof 1 in the course of feeding the charge is as follows:

By means of the driving device 5 the roof 1 is shifted to one end position, whereby it uncovers more than a half of the furnace hearth, whereafter the uncovered part of the hearth is charged from its top. Then, by means of the driving device 5 the roof 1 is shifted to its opposite end position, whereafter the other, now uncovered part of the hearth is loaded with the remaining portion of the charge. After loading the furnace with the charge the roof 1 is shifted by means of the driving device to its middle initial position and closes the furnace.

The above described mode of operation does not exclude the application of shifting the roof 1 towards one side so far that it uncovers the furnace hearth totally, enabling by this way to charge the furnace by a single portion at once. Application of such one-side shifting of the furnace roof 1 depends, as already mentioned hereinabove, on the dimensions of free area of the furnace bay.

We claim:
1. An open-hearth furnace equipped with a shiftable roof comprising a hearth, furnace blocks forming side walls, a pair of spaced stationary roofs at the longitudinal ends of said furnace, a one-piece roof spanning said hearth between said stationary roofs, means for moving said one-piece roof comprising chassis means supporting said roof, guideway means extending along the longitudinal axis of the furnace and supporting said chassis, and drive means to move said chassis along said guideways.

References Cited

UNITED STATES PATENTS

| 287,864 | 11/1883 | Ryder | 266—33 |
| 2,063,402 | 12/1936 | Rossman | 263—46 X |
| 2,386,565 | 10/1945 | Nissim. | |

JOHN J. CAMBY, Primary Examiner

U.S. Cl. X.R.
110—173